US006865055B1

United States Patent
Ou-Yang et al.

(10) Patent No.: US 6,865,055 B1
(45) Date of Patent: Mar. 8, 2005

(54) DISK DRIVE HAVING A SHROUD ASSEMBLY FOR SHIELDING AT LEAST ONE OF A FLEX CABLE AND AN ACTUATOR ARM

(75) Inventors: Jin Hui Ou-Yang, San Jose, CA (US); Lin Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 38 days.

(21) Appl. No.: 10/086,470

(22) Filed: Feb. 28, 2002

(51) Int. Cl.$^7$ .............................................. G11B 33/14
(52) U.S. Cl. ..................................................... 360/97.03
(58) Field of Search ........................ 360/264.2, 97.02, 360/97.03

(56) References Cited

U.S. PATENT DOCUMENTS

| | | | |
|---|---|---|---|
| 5,898,545 A | | 4/1999 | Schirle |
| 5,907,453 A | * | 5/1999 | Wood et al. ............. 360/97.02 |
| 6,125,003 A | | 9/2000 | Tsuda et al. |
| 6,236,533 B1 | * | 5/2001 | Forbord et al. .......... 360/98.01 |
| 6,369,977 B1 | * | 4/2002 | Imai et al. ............... 360/97.02 |
| 6,369,978 B1 | * | 4/2002 | Shimizu et al. .......... 360/97.03 |

FOREIGN PATENT DOCUMENTS

JP          07320478 A   * 12/1995   ........... G11B/33/14

* cited by examiner

*Primary Examiner*—David Davis
(74) *Attorney, Agent, or Firm*—Milad G. Shara, Esq.; Knobbe, Martens, Olson & Bear, LLP (57) ABSTRACT

A shroud assembly for a disk drive that includes a rotatable disk, a printed circuit board, a data transfer head, an actuator assembly and a flex cable, includes a cable shrouding portion. The shroud assembly also includes a disk shrouding portion and a cable mounting portion. The cable mounting portion includes a first surface and a second surface. The first surface is configured to receive a transition portion of the flex cable proximate to a second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk.

36 Claims, 6 Drawing Sheets

DISK DRIVE HAVING A SHROUD ASSEMBLY FOR SHIELDING AT LEAST ONE OF A FLEX CABLE AND AN ACTUATOR ARM

BACKGROUND OF THE INVENTION

1. Field of the Invention

This application relates to a disk drive. More particularly, this application relates to an improved shroud assembly that shields a flexible cable from airflow within a case of the enclosure.

2. Description of the Related Art

One type of data storage device used in a computer to permanently store data is a disk drive. A disk drive includes at least one disk with a magnetic medium that is mounted on and rotated by a spindle motor. The disk drive also includes a data transfer head that writes data onto the magnetic medium and that reads data from the medium in concentric, generally circular tracks. In most applications, the data transfer head is extended out over the magnetic medium by an actuator assembly that moves the head in an arcuate path with respect to the medium. The tracks on the disk are divided into wedge-shaped regions, called sectors, which are presented to the data transfer head by the rotation of the disk.

The disk, the head, the actuator assembly, and other components are housed within a disk drive enclosure to keep contaminants away from the disk and head. In many designs, the arcuate movement of the actuator assembly is achieved by a voice-coil motor (VCM), which is controlled by a servo-system. The data transfer head is connected to a preamplifier on the actuator assembly. Both the VCM and the preamplifier are connected electrically to circuitry, e.g., one or more controllers, mounted on a printed circuit board (PCB). Sometimes a flexible cable, i.e., a "flex cable," is used to connect the data transfer head and the VCM to the PCB. A bracket is sometimes used to connect the flex cable mechanically to a base of the enclosure. As a separate piece, the flex cable bracket adds material and assembly cost to the disk drive.

The servo-system includes servo data written onto the tracks that can be read by the data transfer head to give an indication of how close the head is to the centerline of a track. When the head is over the centerline of the track and follows it, the head is said to be track-following. When the head wanders from the centerline of the track, there is said to be track misregistration, or "TMR." Several factors influence the TMR that the disk drive will experience. For example, rotation of the disk causes airflow in the disk drive enclosure. This airflow impinges upon the disk drive components and causes vibrations in those components that are propagated to the data transfer head. These vibrations cause the head to move with respect to the track below the head, and thus increase the TMR. Increased TMR is not desirable, however, because higher TMR limits track-to-track spacing (i.e., track pitch) and consequently areal density.

SUMMARY OF THE INVENTION

An object of this invention is to provide a shroud assembly that routes the flex cable and that also tends to reduce the TMR experienced by a disk drive.

In one embodiment, the present invention comprises a shroud assembly for a disk drive that includes a rotatable disk, a printed circuit board, a data transfer head, an actuator assembly and a flex cable. The actuator assembly positions the data transfer head with respect to the rotatable disk. The flex cable interconnects the actuator assembly and the printed circuit board. The flex cable has a first end connected to the actuator assembly and a second end connectable to the printed circuit board. The shroud assembly comprises a disk shrouding portion, a cable mounting portion, and a cable shrouding portion. The cable mounting portion includes a first surface and a second surface. The first surface is configured to receive a transition portion of the flex cable proximate to the second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk.

In another embodiment, the present invention comprises a shroud assembly for a disk drive that includes a rotatable disk, a printed circuit board, a data transfer head, an actuator assembly, and a flex cable. The actuator assembly positions the data transfer head with respect to the rotatable disk. The flex cable interconnects the actuator assembly and the printed circuit board. The flex cable has a first end connected to the actuator assembly and a second end connectable to the printed circuit board. The shroud assembly comprises a cable mounting portion, a cable shrouding portion, and an arm shrouding portion. The cable mounting portion comprises a first surface and a second surface. The first surface is configured to receive a transition portion of the flex cable proximate to the second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk. The arm shrouding portion is connected to the cable mounting portion and shields an actuator arm from airflow generated by the rotation of the rotatable disk.

In another embodiment, the present invention comprises a shroud assembly for a disk drive that includes a rotatable disk, a printed circuit board, a data transfer head, an actuator assembly, and a flex cable. The actuator assembly positions the data transfer head with respect to the rotatable disk. The flex cable interconnects the actuator assembly and the printed circuit board. The flex cable has a first end connected to the actuator assembly and a second end connectable to the printed circuit board. The shroud assembly comprises a cable shrouding portion and an arm shrouding portion integrally formed with the cable shrouding portion. The cable shrouding portion is configured to shield a spanning portion of the flex cable between the actuator assembly and the printed circuit board from airflow generated by the rotation of the rotatable disk. The arm shrouding portion is connected to the cable shrouding portion, and is configured to shield an actuator arm from airflow generated by the rotation of the rotatable disk.

In another embodiment, the present invention comprises a shroud assembly for a disk drive that includes a rotatable disk, a printed circuit board, a data transfer head, an actuator assembly and a flex cable. The actuator assembly positions the data transfer head with respect to the rotatable disk. The flex cable interconnects the actuator assembly and the printed circuit board. The flex cable has a first end connected to the actuator assembly and a second end connectable to the printed circuit board. The shroud assembly comprises a cable mounting portion and an arm shrouding portion integrally formed with the cable mounting portion. The cable mounting portion comprises a first surface and a second surface. The first surface is configured to receive a transition portion of the flex cable proximate to the second end. The second surface is configured to receive the second end of the flex cable and to position the second end for engagement by the printed circuit board. The arm shrouding portion is integrally formed with the cable mounting portion, and is configured to shield an actuator arm from airflow generated by the rotation of the rotatable disk.

In another embodiment, the present invention comprises a shroud assembly for a disk drive that includes a rotatable disk, a printed circuit board, a data transfer head, an actuator assembly and a flex cable. The actuator assembly positions the data transfer head with respect to the rotatable disk. The flex cable interconnects the actuator assembly and the printed circuit board. The flex cable has a first end connected to the actuator assembly and a second end connectable to the printed circuit board. The shroud assembly comprises a cable mounting portion and a cable shrouding portion integrally formed with the cable mounting portion. The cable mounting portion comprises a first surface and a second surface. The first surface is configured to receive a transition portion of the flex cable proximate to the second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk.

In another embodiment, the present invention comprises a head-stack assembly for a disk drive that includes a rotatable disk and a printed circuit board. The head-stack assembly comprises a preamplifier, an actuator assembly, a head-gimbal assembly, a flex cable, and a shroud assembly. The actuator assembly includes a body portion, a coil, and an arm. The body portion of the actuator assembly has a bore. The head-gimbal assembly is attached to the actuator assembly. The flex cable interconnects the actuator assembly and the printed circuit board. The flex cable has a first end that is connected to the actuator assembly and a second end that is connectable to the printed circuit board. The shroud assembly comprises a disk shrouding portion, a cable mounting portion, and a cable shrouding portion. The cable mounting portion includes a first surface and a second surface. The first surface is configured to receive a transition portion of the flex cable proximate to the second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk.

In another embodiment, the present invention comprises a disk drive that has a base, a printed circuit board connected to the base, and a disk that is rotatable with respect to the base. The disk drive also has a head-stack assembly and a shroud assembly. The head-stack assembly has an actuator assembly and a flex cable that interconnects the actuator assembly and the printed circuit board. The flex cable has a first end that is connected to the actuator assembly and a second end that is connectable to the printed circuit board. The shroud assembly is mounted on the base and has a disk shrouding portion, a cable mounting portion, and a cable shrouding portion. The cable mounting portion includes a first surface and a second surface. The first surface is configured to receive a transition portion of the flex cable proximate to the second end. The second surface is configured to receive the second end of the flex cable and to position the second end for engagement by the printed circuit board. The cable shrouding portion is configured to shield a spanning portion of the flex cable between the cable mounting portion and the actuator assembly from airflow generated by the rotation of the rotatable disk.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention.

DETAILED DESCRIPTION OF THE PREFERRED EMBODIMENT

Figure 1:
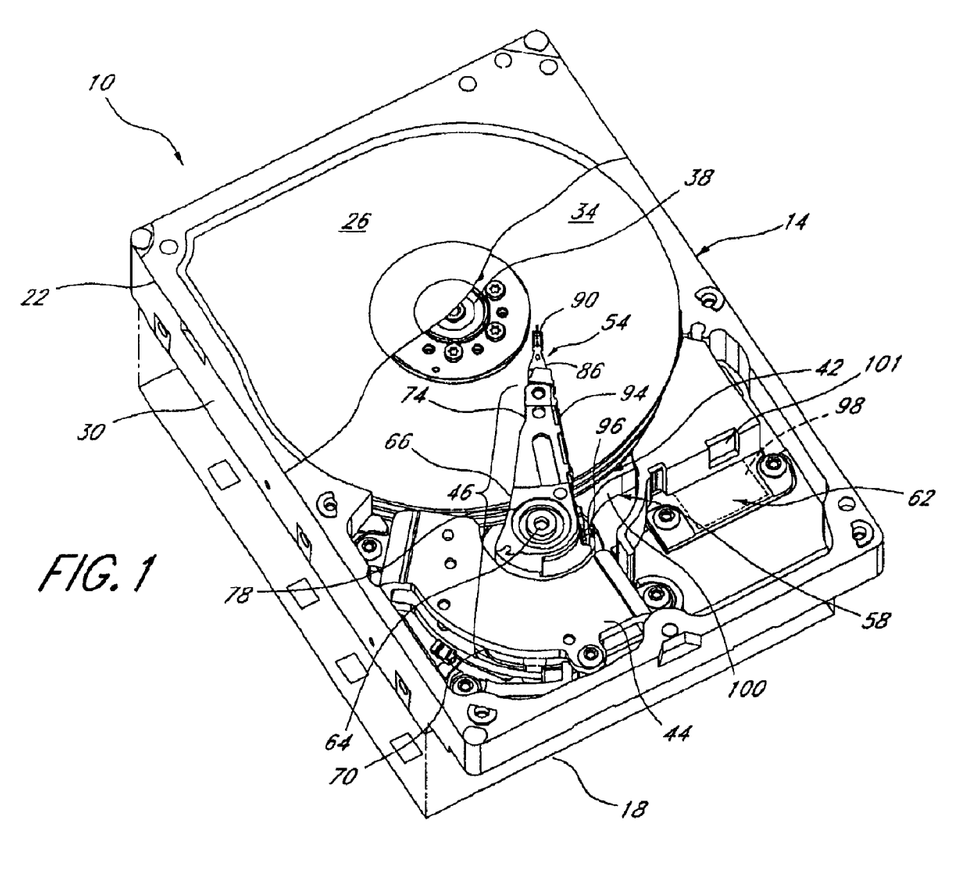
FIG. 1 is a perspective view of a disk drive with a printed circuit board removed and a cover partially broken away to illustrate internal components.
Figure 5:
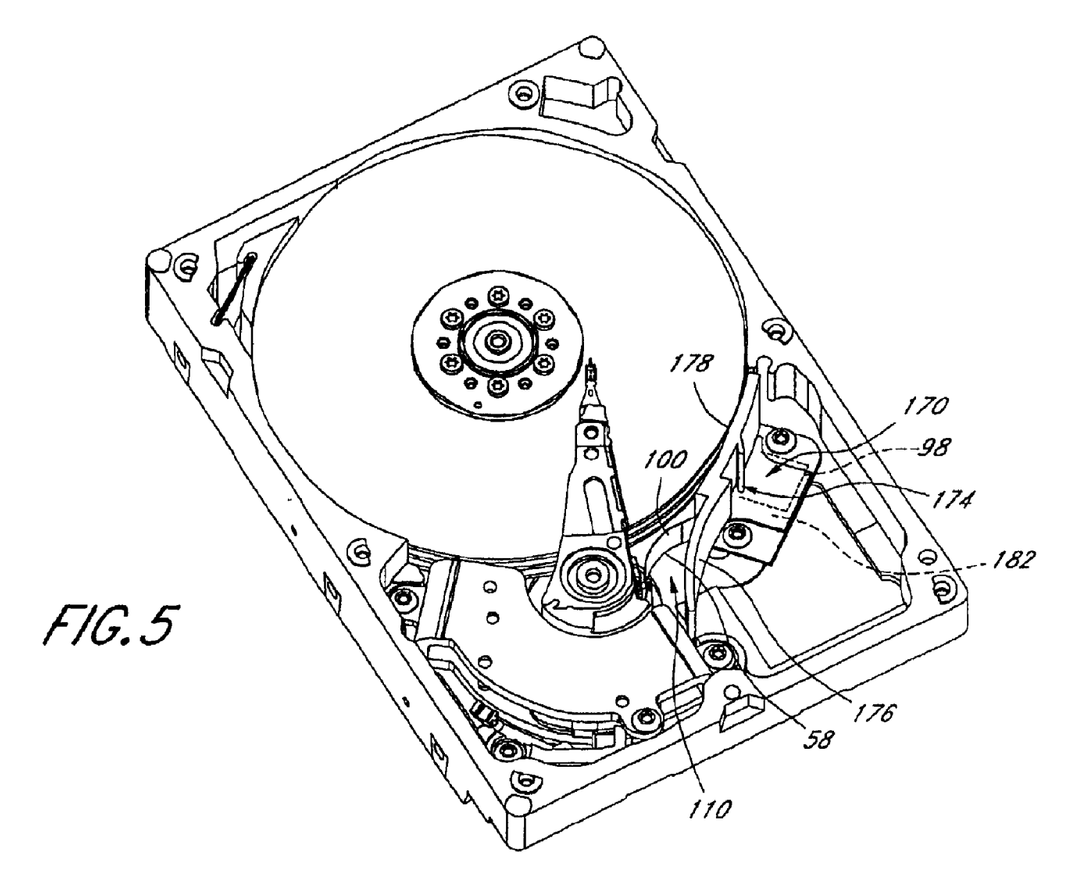
FIG. 5 is a perspective view of a head-disk assembly that includes another embodiment of a shroud assembly.
Figure 6:
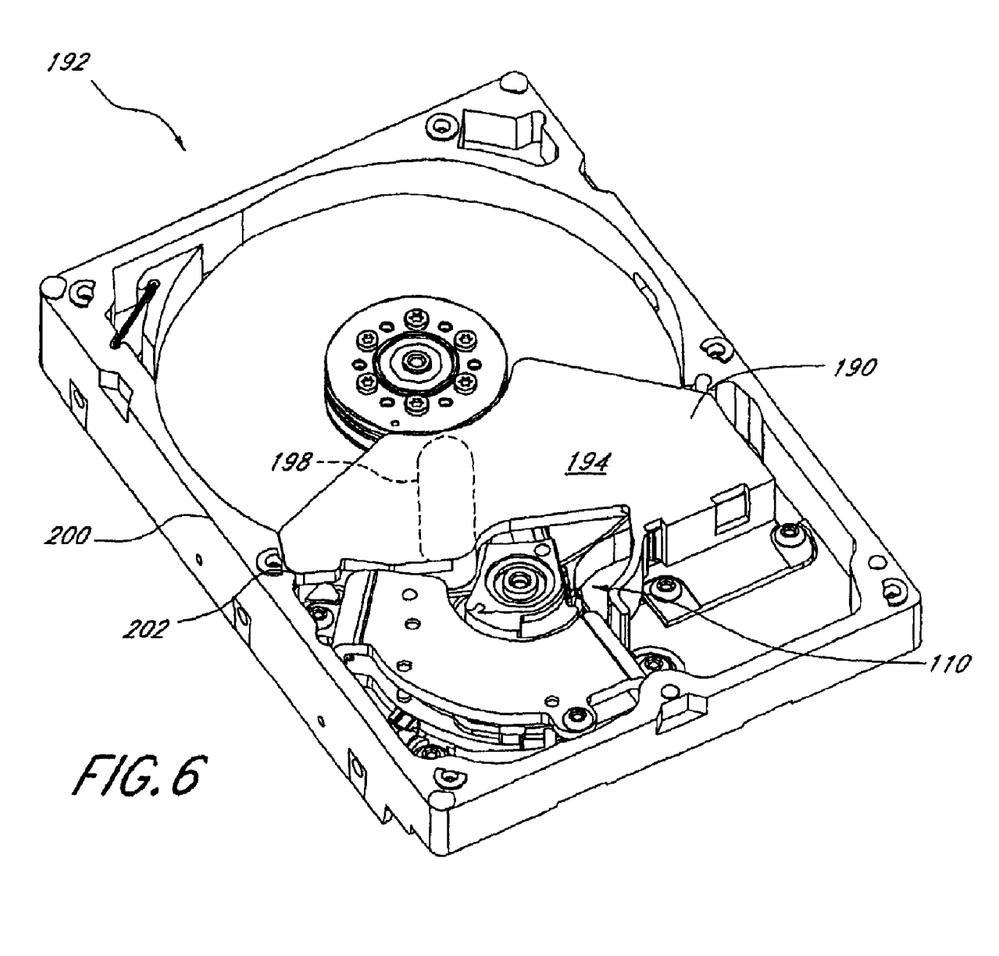
FIG. 6 is a perspective view of a head-disk assembly drive that includes another embodiment of a shroud assembly having an arm shroud.

FIG. 1 is a perspective view of a disk drive 10. The disk drive 10 includes a head-disk assembly (HDA) 14 and a printed circuit board 18. The HDA 14 comprises an enclosure 22 that includes a cover 26 and a base 30. The printed circuit board 18 is connectable to the base 30, but is shown removed therefrom in FIG. 1 for illustration. The HDA 14 also includes at least one disk 34, a spindle motor assembly 38, a head-stack assembly (HSA) 42, and a permanent magnet assembly 44. The disk 34 is mounted on the spindle motor assembly 38 and is rotatable thereby with respect to the base 30. The disk drive 10 of FIGS. 1, 2 and 5 has three disks 34. One skilled in the art will recognize that the shroud assembly embodiments described herein can be used in a disk drive having other numbers of disks 34. For example, FIG. 6 illustrates one embodiment of the shroud assembly described herein incorporated into a disk drive having one disk.

Each disk 34 has at least one surface that has a magnetic medium deposited thereon. Magnetic transitions representing data are written onto and read from the magnetic medium in a known manner.

The HSA 42 includes an actuator assembly 46, a preamplifier (not shown), a head-gimbal assembly (HGA) 54, a flex cable 58, and one embodiment of a shroud assembly 62.

The actuator assembly 46 includes a pivot 64, body portion 66, a coil 70, and an arm 74. The body portion 66 has a bore 78 extending from a first side to a second side. The pivot 64 is located in the bore 78 and attached to the base 30 to provide for pivotal motion of the body portion 66 with respect to the base 30.

The arm 74 extends from a first end proximate the body portion 66 to a second end to which the HGA 54 is attached. The HGA 54 includes a suspension 86, a slider 90 and a conductor 94. The slider 90 includes an element for writing data to the magnetic medium of the disk 34 and an element for reading data from the magnetic medium of the disk. Together, the slider 90 and the elements contained thereon constitute a data transfer head. One skilled in the art will recognize that the read element and the write element can be a single element or can be separate elements on the slider 90. Although described herein with respect to a read/write system, the shroud assembly described herein could also improve track following performance in read-only application, i.e., one having a slider with a read element only. The conductor 94 provides an electrical connection between the elements of the slider 90 and the preamplifier.

In one embodiment, the coil 70 of the actuator assembly 46 extends from the body portion 66 on a side opposite the arm 74. The coil 70 interacts with a permanent magnet located in the permanent magnet assembly 44 when current is passed through the coil to cause the body portion 66 and, ultimately, the slider 90 to rotate about the pivot 64 and to be selectively positioned over the magnetic medium of the disk 34. Control of the positioning is provided by a conventional servo system.

Figure 3:
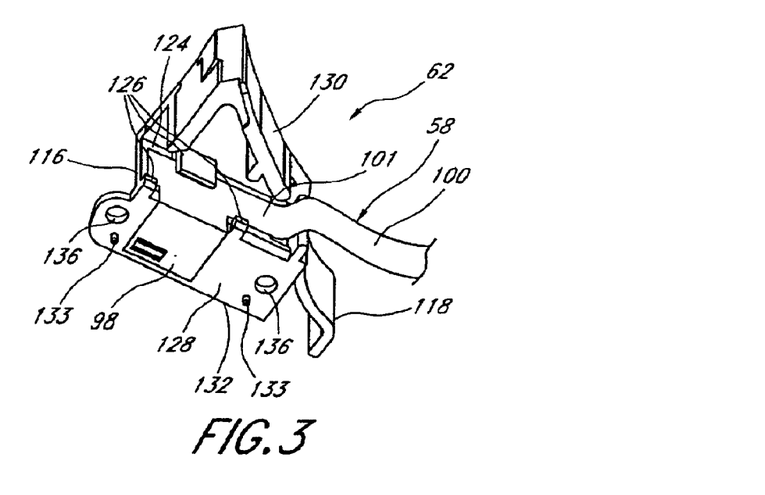
FIG. 3 is a bottom perspective view of one embodiment of a shroud assembly illustrated in FIG. 2 and a portion of a flex cable.

The flex cable 58 is generally a very thin, ribbon-like flexible cable having two sides. As shown in FIGS. 1 and 3, the flex cable 58 has a first end 96, a second end 98, a spanning portion 100 and a transition portion 101. The first end 96 of the flex cable 58 is the end that is connected to the preamplifier. The second end 98 of the flex cable 58 is the end opposite the first end 96 and is connectable to the printed circuit board 18. A spanning portion 100 of the flex cable 58, discussed in more detail below, is a portion of the flex cable 58 proximate the first end 94 in one embodiment. More generally, the spanning portion 100 is any portion of the flex cable 58 that has both of its sides exposed to the atmosphere within the enclosure 22. The transition portion 101 of the flex cable 58, in one embodiment, is the portion between the vertically oriented spanning portion 100 and the horizontally oriented second end 98.

The flex cable 58 contains electrical conductors that electrically connect components on the actuator assembly 46, e.g., the preamplifier and the coil 70, to the circuits mounted on the printed circuit board 18, e.g., a read/write channel and a servo controller.

The spindle motor assembly 38 is also electrically connected to the printed circuit board 18, e.g., to a spindle motor controller. The spindle motor controller controls the rotation of the rotatable shaft and hub of the spindle motor assembly 38 and the disk 34 attached thereto. When operating, the disk 34 is rotated at a substantially constant angular velocity ω.

The rotation of the disk 34 creates airflow within the enclosure 22. The direction and path of a portion of this airflow is shown as the dashed lines "A," "B," "C," "D," "E," "F," and "G" in FIG. 2. Airflow in the enclosure 22 generally follows the rotational movement of the disk 34 as indicated at "A." However, just upstream of the actuator assembly 46, at a first gap 102 between the base 30 and the permanent magnet assembly 44, a portion of the airflow "B" moves away from the disk 34 and around the permanent magnet assembly 44. Another portion of the airflow "C" continues to follow the rotational movement of the disk 34.

Figure 2:
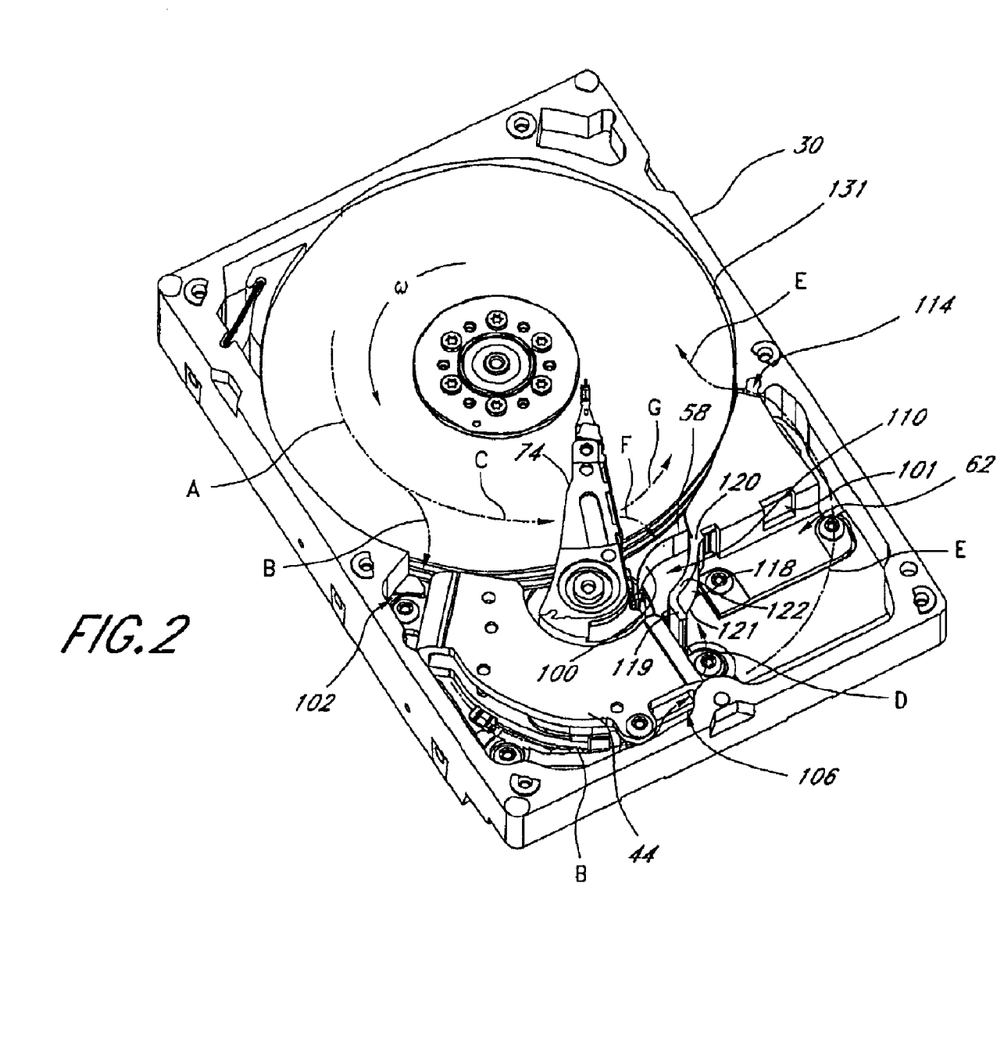
FIG. 2 is a perspective view of a head-disk assembly of the disk drive of FIG. 1 illustrating airflow patterns generated during the operation thereof

The airflow "B" continues through a second gap 106 between the base 30 and the permanent magnet assembly 44. A portion "D" of the airflow "B" is directed toward a flex cable routing area 110. Another portion "E" of the airflow "B" is directed around the shroud assembly 62 and back toward the disk 34 through a third gap 114 defined by the base 30 and the shroud assembly 62. FIG. 2 shows that a cable shrouding portion 118 shields the spanning portion 100, as discussed below.

The airflow "C" in FIG. 2, continues to follow the disk 34 past the first gap 102 until it reaches the vicinity of the actuator arm 74. A portion "F" of the airflow "C" continues past the actuator arm 74 and then moves off of the surface of the disk 34 toward the side of the spanning portion 100 of the flex cable 58 that faces toward the disk 34. Another portion "G" of the airflow "C" continues to follow the rotational movement of the disk 34 (see FIG. 2). Another portion (not shown) of the airflow impinges on the actuator arm 74.

Applicants have discovered that in prior designs, the airflow "D" impinges upon the flex cable 58 in the flex cable routing area 110, e.g., on the side of the spanning portion 100 of the flex cable 58 that faces away from the disk 34. Furthermore, applicants have discovered that in prior designs the airflow "F" impinges upon the side of the flex cable 58 that faced toward the disk 34. As discussed above, the impact of such airflow on the flex cable 58 causes vibration of the flex cable, which increases the TMR in the prior designs. Accordingly, one embodiment of the present invention includes a shroud assembly 62 configured to shield the spanning portion 100 of the flex cable 58 from at least a portion of one of the airflow "D" and the airflow "F."

FIG. 3 illustrates one embodiment of the shroud assembly 62 in more detail. The shroud assembly 62 includes a cable mounting portion 116, a cable shrouding portion 118, and a disk shrouding portion 130. In one embodiment, the cable mounting portion 116 includes a first surface 124 and a second surface 128. The second surface 128 receives the second end 98 of the flex cable 58. The second end 98 of the flex cable 58 is the end that is connectable to the printed circuit board 18. The second surface 128 positions the second end 98 for connection to the printed circuit board 18 and also tends to hold the second end 98 of the flex cable 58 in place. The first surface 124 receives a portion of the flex cable 58 proximate to the second end 98, e.g., the transition portion 101. In one embodiment, the transition portion 101 is threaded through three retaining clips 126 to secure it in place. The retaining clips 126 preferably are integrally formed portions of the shroud assembly 62. The retaining clips 126 are configured to make the assembly of the HSA 42 simple. The transition portion 101 of the flex cable 58 could be secured to the shroud assembly 62 in other suitable ways, as will be recognized by one skilled in the art. For example, other numbers of retaining clips, adhesives, other mechanical fasteners, and other fastening devices could be used.

In one embodiment, the first surface 124 of the cable mounting portion 116 is generally perpendicular to the second surface 128 of the cable mounting portion 116. The first surface 124 and the second surface 128 could be arranged in other ways within the scope of the invention claimed herein. For example, in one variation the first surface 124 and the second surface 128 may advantageously be disposed at non-perpendicular angles with respect to each other. Or, the first surface 124 and the second surface 128 may advantageously be combined into one continuously curved surface. Many other configurations are also possible, e.g., the shroud assembly 62 may advantageously include a third surface between the first surface 124 and the second surface 128.

The shroud assembly 62 thus secures the flex cable 58 so that it does not move inside the enclosure 22 and also routes the flex cable so that the second end 98, which is configured to be connected to the printed circuit board 18, is properly positioned for such connection.

In one embodiment, the cable shrouding portion 118 further comprises a distal end 119 and a mounted end 120. A length is defined as distance between the distal end 119 and the mounted end 120. The cable shrouding portion 118 also comprises, in this embodiment, a first edge 121 proximate the cable mounting portion 116, and a second edge 122 opposite the first edge 121. A width is defined as the perpendicular distance between the first edge 121 and the second edge 122. In one embodiment, the length of the cable shrouding portion 118 is about twice the width of the cable shrouding portion 118. In another embodiment, the length of the cable shrouding portion 118 is about equal to the length of the disk shrouding portion 130.

The cable shrouding portion 118 can be formed in any number of shapes. FIGS. 2 and 3 illustrate one embodiment where the cable shrouding portion 118 forms an arc. In this embodiment, the inside surface of the arc is located on a side of the shroud assembly 62 that faces the disk 34 when the shroud assembly is positioned in the disk drive 10. In another embodiment, the cable shrouding portion 118 forms an arc that has an inner surface that faces the opposite direction (i.e., away from the disk 34 when the shroud assembly 62 is in the disk drive 10). This oppositely facing shrouding portion arc is illustrated in FIG. 5. In another embodiment, the cable shrouding portion 118 extends along a generally straight line from an edge of the first surface 124 toward the permanent magnet assembly 44 when the shroud assembly is inserted into the disk drive 10. Many other shapes are possible, as should be recognized by one skilled in the art.

The configuration of the cable shrouding portion 118 may also take into account the presence and location of any structure located in or on the enclosure proximate the position of the cable shrouding portion 118. Such structure could be a raised portion of the base 30 or a lowered portion of the cover 26, for example. Where such structures are present proximate the cable shrouding portion 118, the cable shrouding portion can be shaped to avoid them.

The cable shrouding portion 118 of the shroud assembly 62 shields the spanning portion 100 of the flex cable 58 from airflow generated by the rotation of the disk 34, e.g., the airflow shown in FIG. 2. As discussed above, the spanning portion 100 is the portion of the flex cable 58 between the first end 96 and the transition portion 101 secured at the first surface 124. As discussed above in connection with FIG. 2, the impact of the airflow on the spanning portion 100 of the flex cable 58 can increase the TMR of the disk drive. When the shroud assembly 62 is positioned in the disk drive 10, the cable shrouding portion 118 is located between the spanning portion 100 and the direction of the airflow "D," and therefore protects the spanning portion 100 from such airflow. The cable shrouding portion 118 thereby tends to reduce the TMR of the disk drive 10.

In another embodiment, the cable shrouding portion 118 is located and configured so that when the shroud assembly 62 is positioned in the disk drive 10, the cable shrouding portion 118 is between the spanning portion 100 and the disk 34. In this position, the cable shrouding portion 118 shields the spanning portion 100 from the airflow "D."

The disk shrouding portion 130 of the shroud assembly 62 is provided with a generally smooth, generally cylindrical curved surface. The cylindrical curved surface of the disk shrouding portion 130 and the outer circumference of the disk 34 are preferably concentric. A clearance is provided between the disk shrouding portion 130 and the disk 34 so that the disk shrouding portion 130 does not interfere with the rotation of the disk 34. However, the disk shrouding portion 130 is placed close enough to the disk 34 to reduce disk flutter and to protect the suspension 86 from the airflow within the enclosure 22. In one embodiment, the disk shrouding portion 130 is formed as a separate extension of a disk shroud 131 of the base 30. In certain embodiments discussed herein, a shroud assembly is provided without a disk shrouding portion 130.

In one embodiment, the shroud assembly 62 further comprises a shroud assembly mounting portion 132. The shroud assembly mounting portion 132 is configured to be mechanically connected to the base 30 of the disk drive 10. In one embodiment, the shroud assembly mounting portion 132 includes one or more through-holes 136 that are sized to receive suitable fasteners, such as screws (see FIG. 3). Other fastening techniques are also possible. For example one or more locating features 133 could be located on the cable mounting portion 116. As discussed below in connection with FIG. 4, the locating features 133 advantageously are used when pressure-mounting any of the shroud assembly embodiments described herein. One skilled in the art will recognize that the shroud assembly embodiments described herein could also be mounted in other ways, e.g., by using an adhesive. In one embodiment, the second surface 128 of the cable mounting portion 116 forms at least a portion of the shroud assembly mounting portion 132.

Figure 4:
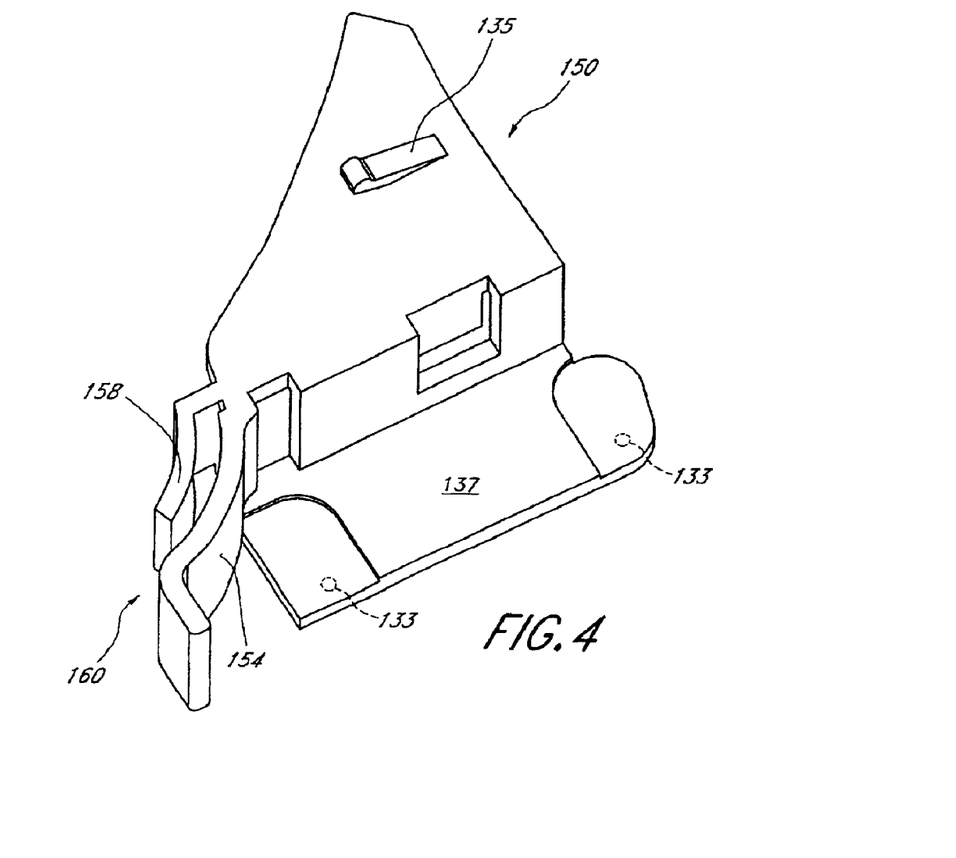
FIG. 4 is a top perspective view of another embodiment of a shroud assembly.

FIG. 4 illustrates another embodiment of a shroud assembly 150, that is similar to the shroud assembly 62, except as detailed below. The shroud assembly 150 includes a first cable shrouding portion 154 and a second cable shrouding portion 158. The first cable shrouding portion 154 and the second cable shrouding portion 158 define a space 160 to receive the spanning portion 100 of the flex cable 58. The first cable shrouding portion 154 is similar to the cable shrouding portion 118. The second cable shrouding portion 158 may have the same shape as the first cable shrouding portion 154, may be a mirror image thereof, or may have a different shape. As discussed above in connection with the cable shrouding portion 118, the first cable shrouding portion 154 protects the flex cable 58 from the airflow "D" that is directed toward the side of the spanning portion 100 that faces away from the disk 34. The second cable shrouding portion 158 protects the flex cable 58 from the airflow "F" that is directed toward the side of the spanning portion 100 that faces toward the disk 34. In this configuration, both sides of the spanning portion 100 of the flex cable 58 are shrouded from airflow, further reducing vibration of the flex cable 58 and thereby further reducing TMR of the disk drive 10.

The shroud assembly 150 also advantageously includes a flexible protrusion 135 and a cable mounting portion 137 that includes the locating features 133. During assembly of the disk drive 10, the shroud assembly 150 is mounted in the enclosure 22. To secure the shroud assembly 150 in place, the locating features 133, which are shown as short protrusions in FIG. 3, are inserted into corresponding holes or depressions in the base 30. When the shroud assembly 150 is positioned on the base 30, the height of the top of the flexible protrusion 135 is higher than the top of the base 30. Accordingly, the flexible protrusions 135 is deflected when the cover 26 is mounted onto the top of the base 30. The deflection of the flexible protrusion 135 causes a reaction force to be applied by the cover to the shroud assembly 150. This reaction force holds the shroud assembly 150 in place in the enclosure 22.

FIG. 5 illustrates another embodiment of a shroud assembly 170 positioned within a HDA. The shroud assembly 170 is similar to the shroud assembly 62, except as detailed below. The shroud assembly 170 has a cable mounting portion 174 and a cable shrouding portion 176. The cable mounting portion 174 has a first surface 178 and a second surface 182. The first surface 178 receives a transition portion of the flex cable 58. Clips similar to the clips 126 or other suitable fasteners are provided on the first surface 178 to secure the transition portion 101 of the flex cable 58. The first surface 178 of the shroud assembly 170 also functions as a disk shrouding portion, i.e., it is placed close enough to the disk 34 to reduce disk flutter and to protect the suspension 86 from the airflow within the enclosure 22. The second surface 182 routes the flex cable 58 so that the second end 98 of the flex cable is positioned to be connected to the printed circuit board 18. FIG. 5 illustrates that the routing of the flex cable 58 for the shroud assembly 174 is different from the routing of the flex cable 58 for the shroud assembly 62. The flex cable 58 is positioned to be engaged by the printed circuit board 18 at a position much closer to the disk 34 and at an angle with respect to the longitudinal axis of the base 30. This provides a shroud assembly that is generally smaller, and that generally reduces cost. The cable shrouding portion 176 of the shroud assembly 170 shields the spanning portion 100 of the flex cable 58 in the flex cable routing area 110, as discussed above.

Figure 7:
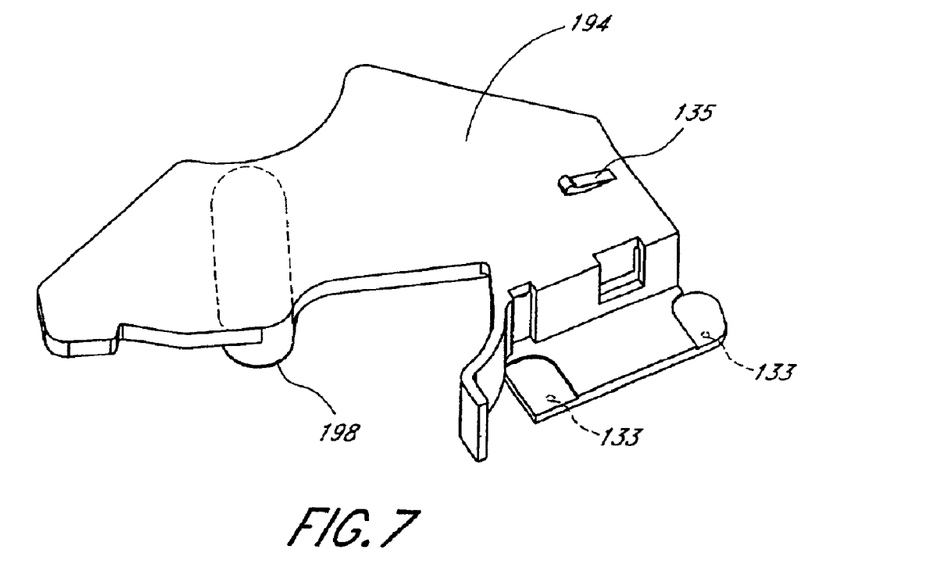
FIG. 7 is a top perspective view of the shroud assembly illustrated in FIG. 6.
Figure 8:
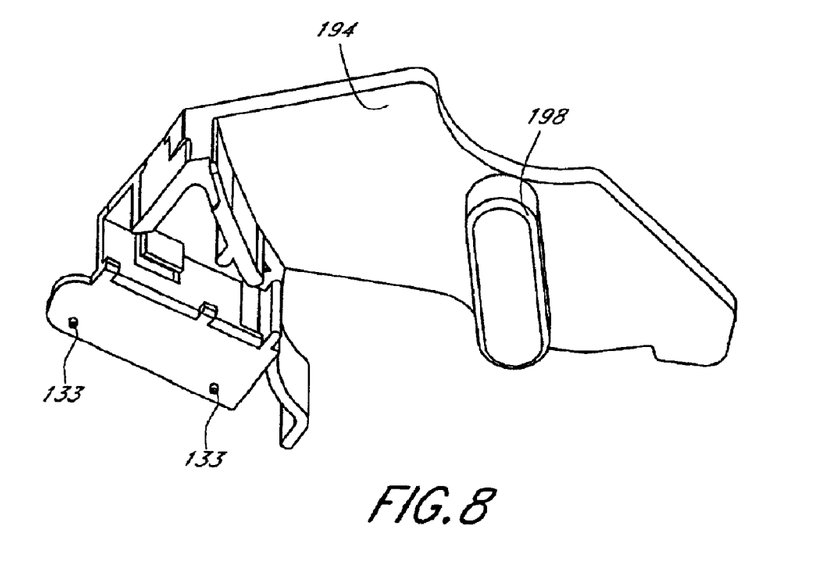
FIG. 8 is a bottom perspective view of the shroud assembly illustrated in FIG. 6.

FIGS. 6–8 illustrates another embodiment of a shroud assembly 190. FIG. 6 illustrates the shroud assembly 190 incorporated into an HDA 192. The HDA 192 is similar to the HDA 14, except that it has only one disk 34. However, as discussed above, one skilled in the art will recognize that the shroud assembly 190 could be used in a disk drive having more than one disk 34. FIGS. 6–8 illustrate two approaches to mounting the shroud assembly 190. FIG. 6 shows a screw-mount type, as discussed above. FIGS. 7 and 8 illustrate a pressure-mount type, as discussed above in connection with FIG. 4.

The shroud assembly 190 is similar to the shroud assembly 62, except as detailed below. The shroud assembly 190 comprises an extending portion 194 and an arm shrouding portion 198. In one embodiment, the extending portion 194 projects out from the disk shrouding portion 130 of the shroud assembly 190 at approximately a right angle. The extending portion 194 is sized and configured to extend from the cable routing area 110 of the HDA 192 to a location over the disk 34. In one embodiment, the extending portion 194 extends almost to the outer circumference of the hub of the spindle motor assembly 38, with a small gap to provide clearance for the hub. The extending portion 194 also extends laterally from the flex cable routing area 110 toward an opposite side 200 of the base 30. In one embodiment, the extending portion 194 extends all the way to the opposite side 200 of the base 30 and is supported by a shoulder area 202 of the opposite side 200. The arm shrouding portion 198 of the shroud assembly 190 extends from a side of the extending portion 194 that faces the disk 34, i.e., the underside of the extending portion 194. The position of the arm shrouding portion 198 is such that when the shroud assembly 190 is positioned in the HDA 192, the arm shrouding portion 198 is located upstream of the actuator arm 74 of the HSA 42. As used herein, "upstream" means located between the point of reference and the source of airflow (e.g., the actuator arm 74). In the illustrated embodiment, an "upstream" location is one that is clockwise of a given location when viewed from the side of the HDA 192 that faces the cover (See FIG. 1). In this position, the arm shrouding portion 198 protects the arm 74 from the airflow "C" and thereby reduces vibrations that would otherwise be induced in the arm 74 by the airflow. By reducing the vibrations that would otherwise be induced in the arm 74, the arm shrouding portion 198 reduces TMR of the HDA 192.

Although the preferred embodiment of the shroud assembly 190 includes the cable mounting portion 116, the cable shrouding portion 118, the disk shrouding portion 130, and the arm shrouding portion 198, the invention claimed below can be carried out with fewer than all of these components. For example one embodiment includes the cable mounting portion 116, the cable shrouding portion 118, and the arm shrouding portion 198, which are all integrally formed. Another integrally formed embodiment includes the cable shrouding portion 118 and the arm shrouding portion 198. Yet another integrally formed embodiment includes the cable mounting portion 116 and the arm shrouding portion 198.

What is claimed is:

1. A shroud assembly for a disk drive that includes a rotatable disk, a printed circuit board, a data transfer head, an actuator assembly that positions the data transfer head with respect to the rotatable disk, and a flex cable that interconnects the actuator assembly and the printed circuit board, the flex cable having a first end connected to the actuator assembly and a second end connectable to the printed circuit board, the shroud assembly comprising:

a disk shrouding portion;

a cable mounting portion comprising a first surface and a second surface, the first surface configured to receive and to restrain a transition portion of the flex cable proximate to the second end, the second surface configured to receive the second end of the flex cable and to position the second end for engagement by the printed circuit board; and a cable shrouding portion configured to shield a spanning portion of the flex cable between the cable mounting portion and the actuator assembly from airflow generated by the rotation of the rotatable disk;

wherein the spanning portion of the flex cable is unrestrained by the cable shrouding portion when the shroud assembly is applied to the disk drive.

2. The shroud assembly of claim 1, wherein the disk shrouding portion, the cable mounting portion, and the cable shrouding portion are integrally formed.

3. The shroud assembly of claim 1, wherein the cable shrouding portion further comprises a distal end, a mounted end, a first edge proximate the cable mounting portion, a second edge opposite the first edge, a length being the distance between the distal end and the mounted end, and a width being the distance between the first edge and the second edge, the length being about two times the width.

4. The shroud assembly of claim 1, wherein the cable shrouding portion is about as long as the disk shrouding portion.

5. The shroud assembly of claim 1, wherein the cable shrouding portion forms an arc having an inside surface, the inside surface located on a side of the shroud assembly opposite the cable mounting portion.

6. The shroud assembly of claim 1, wherein the cable shrouding portion forms an arc having an inside surface, the inside surface of the arc and the cable mounting portion facing generally the same direction.

7. The shroud assembly of claim 1, wherein the first surface of the cable mounting portion is generally perpendicular to the second surface of the cable mounting portion.

8. The shroud assembly of claim 1, further comprising a shroud assembly mounting portion that is configured to be connected to a base of the disk drive.

9. The shroud assembly of claim 8, wherein the second surface of the cable mounting portion comprises at least a portion of the shroud assembly mounting portion.

10. The shroud assembly of claim 1, wherein the cable shrouding portion further comprises a first cable shrouding portion and a second cable shrouding portion, the first cable shrouding portion and the second cable shrouding portion define a space to receive the spanning portion of the flex cable.

11. The shroud assembly of claim 1, further comprising an arm shrouding portion.

12. The shroud assembly of claim 1, further comprising a flexible protrusion and at least one locating feature, wherein the locating feature is configured to mate with a base of the disk drive, and the flexible protrusion is configured to be deflected by a cover of the disk drive to apply pressure to the shroud assembly to hold the shroud assembly in place.

13. A shroud assembly for a disk drive that includes a rotatable disk, a printed circuit board, a data transfer head, an actuator assembly that includes an actuator arm and that positions the data transfer head with respect to the rotatable disk, and a flex cable that interconnects the actuator assembly and the printed circuit board, the flex cable having a first end connected to the actuator assembly and a second end connectable to the printed circuit board, the shroud assembly comprising:

a cable mounting portion comprising a first surface and a second surface, the first surface configured to receive and to restrain a transition portion of the flex cable proximate to the second end, the second surface configured to receive the second end of the flex cable and to position the second end for engagement by the printed circuit board;

a cable shrouding portion configured to shield a spanning portion of the flex cable between the cable mounting portion and the actuator assembly from airflow generated by the rotation of the rotatable disk; and an arm shrouding portion connected to the cable mounting portion, the arm shrouding portion configured to shield an actuator arm from airflow generated by the rotation of the rotatable disk;

wherein the spanning portion of the flex cable is unrestrained by the cable shrouding portion when the shroud assembly is applied to the disk drive.

14. A shroud assembly for a disk drive that includes a rotatable disk, a printed circuit board, a data transfer head, an actuator assembly that includes an actuator arm and that positions the data transfer head with respect to the rotatable disk, and a flex cable that interconnects the actuator assembly and the printed circuit board, the flex cable having a first end connected to the actuator assembly and a second end connectable to the printed circuit board, the shroud assembly comprising:

a cable shrouding portion configured to shield a spanning portion of the flex cable between the actuator assembly and the printed circuit board from airflow generated by the rotation of the rotatable disk; and an arm shrouding portion integrally formed with the cable shrouding portion, the arm shrouding portion configured to shield an actuator arm from airflow generated by the rotation of the rotatable disk;

wherein the spanning portion of the flex cable is unrestrained by the cable shrouding portion when the shroud assembly is applied to the disk drive.

15. A shroud assembly for a disk drive that includes a rotatable disk, a printed circuit board, a data transfer head, an actuator assembly that includes an actuator arm and that positions the data transfer head with respect to the rotatable disk, and a flex cable that interconnects the actuator assembly and the printed circuit board, the flex cable having a first end connected to the actuator assembly and a second end connectable to the printed circuit board, the shroud assembly comprising:

a cable mounting portion comprising a first surface and a second surface, the first surface configured to receive a transition portion of the flex cable proximate to the second end, the second surface configured to receive the second end of the flex cable and to position the second end for engagement by the printed circuit board; and an arm shrouding portion integrally formed with the cable mounting portion, the arm shrouding portion configured to extend over a portion of the rotatable disk and to shield an actuator arm from airflow generated by the rotation of the rotatable disk.

16. A shroud assembly for a disk drive that includes a rotatable disk, a printed circuit board, a data transfer head, an actuator assembly that positions the data transfer head with respect to the rotatable disk, and a flex cable that interconnects the actuator assembly and the printed circuit board, the flex cable having a first end connected to the actuator assembly and a second end connectable to the printed circuit board, the shroud assembly comprising:

a cable mounting portion comprising a first surface and a second surface, the first surface configured to receive and to restrain a transition portion of the flex; cable proximate to the second end, the second surface configured to receive the second end of the flex cable and to position the second end for engagement by the printed circuit board; and a cable shrouding portion integrally formed with the cable mounting portion, the cable shrouding portion configured to shield a spanning portion of the flex cable between the cable mounting portion and the actuator assembly from airflow generated by the rotation of the rotatable disk;

wherein the spanning portion of the flex cable is unrestrained by the cable shrouding portion when the shroud assembly is applied to the disk drive.

17. A head-stack assembly for a disk drive that includes a rotatable disk and a printed circuit board, the head-stack assembly comprising:

a preamplifier;

an actuator assembly comprising a body portion, a coil, and an arm, the body portion having a bore;

a head-gimbal assembly attached to the actuator assembly;

a flex cable that interconnects the actuator assembly and the printed circuit board, the flex cable having a first end connected to the actuator assembly and a second end connectable to the printed circuit board; and a shroud assembly comprising:
  a disk shrouding portion;
  a cable mounting portion comprising a first surface and a second surface, the first surface configured to receive and to restrain a transition portion of the flex cable proximate to the second end, the second surface configured to receive the second end of the flex cable and to position the second end for engagement by the printed circuit board; and
  a cable shrouding portion configured to shield a spanning portion of the flex cable between the cable mounting portion and the actuator assembly from airflow generated by the rotation of the rotatable disk,
    wherein the spanning portion of the flex cable is unrestrained by the cable shrouding portion when the shroud assembly is applied to the disk drive.

18. The head-stack assembly of claim 17, wherein the disk shrouding portion, the cable mounting portion, and the cable shrouding portion are integrally formed.

19. The head-stack assembly of claim 17, wherein the cable shrouding portion is about as long as the disk shrouding portion.

20. The head-stack assembly of claim 17, wherein the first surface of the cable mounting portion is generally perpendicular to the second surface of the cable mounting portion.

21. The head-stack assembly of claim 17, wherein the shroud assembly further comprises a shroud assembly mounting portion that is configured to be connected to a base of the disk drive.

22. The head-stack assembly of claim 17, wherein the second surface of the cable mounting portion comprises at least a portion of the shroud assembly mounting portion.

23. The head-stack assembly of claim 17, wherein the cable shrouding portion further comprises a first cable shrouding portion and a second cable shrouding portion, the first cable shrouding portion and the second cable shrouding portion define a space to receive the spanning portion of the flex cable.

24. The head-stack assembly of claim 23, wherein the spanning portion of the flex cable is located between the first cable shrouding portion and the second cable shrouding portion.

25. The head-stack assembly of claim 23, wherein the shroud assembly further comprises a flexible protrusion and at least one locating feature, the locating feature configured to mate with a base of the disk drive, and the flexible protrusion configured to be deflected by a cover of the disk drive to apply pressure to the shroud assembly to hold the shroud assembly in place.

26. A disk drive comprising:
  a base;
  a printed circuit board connected to the base;
  a disk that is rotatable with respect to the base;
  a head-stack assembly having an actuator assembly and a flex cable that interconnects the actuator assembly and the printed circuit board, the flex cable having a first end connected to the actuator assembly and a second end connectable to the printed circuit board; and
  a shroud assembly mounted on the base, the shroud comprising:
    a disk shrouding portion;
    a cable mounting portion comprising a first surface and a second surface, the first surface configured to receive and to restrain a transition portion of the flex cable proximate to the second end, the second surface configured to receive the second end of the flex cable and to position the second end for engagement by the printed circuit board; and
    a cable shrouding portion configured to shield a spanning portion of the flex cable between the cable mounting portion and the actuator assembly from airflow generated by the rotation of the rotatable disk;
      wherein the spanning portion of the flex cable is unrestrained by the cable shrouding portion when the shroud assembly is applied to the disk drive.

27. The disk drive of claim 26, wherein the disk shrouding portion, the cable mounting portion, and the cable shrouding portion are integrally formed.

28. The disk drive of claim 26, wherein the cable shrouding portion is configured to shield the spanning portion of the flex cable from airflow that impinges upon a side of the flex cable that faces away from the disk.

29. The disk drive of claim 26, wherein the cable shrouding portion is located so that the spanning portion of the flex cable is between the cable shrouding portion and the disk.

30. The disk drive of claim 26, wherein the cable shrouding portion further comprises a first cable shrouding portion and a second cable shrouding portion, the first cable shrouding portion and the second cable shrouding portion define a space to receive the spanning portion of the flex cable.

31. The disk drive of claim 30, wherein the second cable shrouding portion is configured to shield the spanning portion of the flex cable from airflow that impinges upon a side of the flex cable that faces toward the disk.

32. The disk drive of claim 30, wherein the second cable shrouding portion is located between the first cable shrouding portion and the disk, and the spanning portion of the flex cable is located between the first cable shrouding portion and the second cable shrouding portion.

33. The disk drive of claim 26, wherein the shroud assembly is located downstream of the actuator assembly.

34. The disk drive of claim 26, wherein the shroud assembly further comprises an arm shrouding portion positioned upstream of the actuator assembly, the arm shrouding portion configured to shield the actuator arm from airflow generated by the rotation of the rotatable disk.

35. The disk drive of claim 26, wherein the first surface of the cable mounting portion is generally parallel to the axis of rotation of the disk when the shroud assembly is positioned in the disk drive.

36. The disk drive of claim 26, wherein the shroud assembly further comprises a flexible protrusion and at least one locating feature, the locating feature configured to mate with the base, and the flexible protrusion configured to be deflected by the cover to apply pressure to the shroud assembly to hold the shroud assembly in place.

* * * * *